US009709448B2

(12) United States Patent
DeSilva et al.

(10) Patent No.: US 9,709,448 B2
(45) Date of Patent: *Jul. 18, 2017

(54) ACTIVE MEASUREMENT OF GAS FLOW TEMPERATURE, INCLUDING IN GAS TURBINE COMBUSTORS

(71) Applicant: Siemens Energy, Inc., Orlando, FL (US)

(72) Inventors: Upul P. DeSilva, Oviedo, FL (US); Heiko Claussen, North Brunswick, NJ (US)

(73) Assignee: Siemens Energy, Inc., Orlando, FL (US)

( * ) Notice: Subject to any disclaimer, the term of this patent is extended or adjusted under 35 U.S.C. 154(b) by 617 days.

This patent is subject to a terminal disclaimer.

(21) Appl. No.: 14/207,741

(22) Filed: Mar. 13, 2014

(65) Prior Publication Data
US 2015/0168230 A1 Jun. 18, 2015

Related U.S. Application Data

(63) Continuation-in-part of application No. 14/132,001, filed on Dec. 18, 2013.

(51) Int. Cl.
*G01K 7/42* (2006.01)
*G01K 11/24* (2006.01)
(Continued)

(52) U.S. Cl.
CPC ............ *G01K 11/24* (2013.01); *F01D 17/085* (2013.01); *F01D 21/12* (2013.01); *F23N 5/003* (2013.01);
(Continued)

(58) Field of Classification Search
CPC ......... F05D 2270/303; F05D 2270/804; F05D 2270/806; G01M 15/14; G01K 7/42; G01F 25/007; G01F 1/667
(Continued)

(56) References Cited

U.S. PATENT DOCUMENTS 4,320,666 A * 3/1982 Redding ................. G01P 5/248
73/861.28
4,676,665 A 6/1987 Twerdochlib
(Continued)

FOREIGN PATENT DOCUMENTS

EP 113961 A1 7/1984
EP 125061 A 11/1984
(Continued)

OTHER PUBLICATIONS

Desilva U. et al.: "Novel Gas Turbine Exhaust Temperature Measurement System" Proceedings of ASME Turbo Expo 2013; pp. 1-8; XP055115290; From the Internet URL:http://proceedings.asmedigitalcollection.asme.org/proceeding.aspx?articleid=I776302 / Mar. 6, 2013.
(Continued)

*Primary Examiner* — William H Rodriguez

(57) ABSTRACT

Active acoustic pyrometry-based gas flow temperature measurement, such as for monitoring of gas turbine combustors, including industrial gas turbine (IGT) combustors is incorporated into the combustion monitoring and control system by addition of an acoustic transmitter or acoustic transceiver that transmits a sound wave in a line-of-sight with a plurality of acoustic sensors, such as dynamic pressure sensors. For temperature measurement, in some embodiments sound transmission time-of-flight that is directed generally transverse the gas flow path is measured by the controller and correlated with gas flow temperature along the line-of-sight. In other embodiments line-of-sight correlated gas flow temperatures in up and down stream planar paths are interpolated. In an integrated thermoacoustic pressure-based sensor and monitoring/control system embodiment, the controller determines absolute active path temperatures with acoustic transmission and time-of-flight analysis techniques.

9 Claims, 8 Drawing Sheets

(51) Int. Cl.
- *G01M 15/14* (2006.01)
- *F01D 17/08* (2006.01)
- *G01K 13/02* (2006.01)
- *G01F 1/66* (2006.01)
- *F01D 21/12* (2006.01)
- *F23N 5/00* (2006.01)
- *F23N 5/16* (2006.01)

(52) U.S. Cl.
CPC ............. *F23N 5/16* (2013.01); *G01F 1/66* (2013.01); *G01F 1/667* (2013.01); *G01K 13/02* (2013.01); *G01M 15/14* (2013.01); *F23N 2025/08* (2013.01); *F23N 2041/20* (2013.01); *G01K 2013/024* (2013.01)

(58) Field of Classification Search
USPC ........ 701/100; 702/45, 48, 54, 130, 142, 50, 702/176; 374/141, 117–119, 120, 45, 374/147, 144; 73/861.18–861.31, 73/204.11–204.27
See application file for complete search history.

(56) References Cited

U.S. PATENT DOCUMENTS

| | | | |
|---|---|---|---|
| 5,115,670 A | 5/1992 | Shen | |
| 5,369,998 A * | 12/1994 | Sowerby | G01F 1/66 73/861.04 |
| 5,719,791 A | 2/1998 | Neumeier et al. | |
| 5,784,300 A | 7/1998 | Neumeier et al. | |
| 5,918,281 A * | 6/1999 | Nabulsi | G01F 1/10 73/597 |
| 6,389,330 B1 | 5/2002 | Khesin | |
| 6,480,750 B2 | 11/2002 | Junk | |
| 6,494,105 B1 * | 12/2002 | Gallagher | G01F 1/662 73/861.27 |
| 6,546,328 B1 | 4/2003 | Slicker | |
| 6,850,836 B1 | 2/2005 | Scholl | |
| 7,008,218 B2 | 3/2006 | Zhang et al. | |
| 7,159,472 B1 | 1/2007 | Hastings et al. | |
| 7,191,073 B2 | 3/2007 | Astley et al. | |
| 7,202,794 B2 | 4/2007 | Huseynov et al. | |
| 7,278,266 B2 | 10/2007 | Taware et al. | |
| 7,484,369 B2 | 2/2009 | Myhre | |
| 7,795,783 B2 * | 9/2010 | Trochesset | G01F 1/662 310/334 |
| 7,853,433 B2 * | 12/2010 | He | F23N 5/242 60/772 |
| 8,001,761 B2 | 8/2011 | Myers, Jr. et al. | |
| 2004/0194539 A1 | 10/2004 | Gysling | |
| 2005/0132712 A1 | 6/2005 | Krok et al. | |
| 2006/0137353 A1 | 6/2006 | Lieuwen et al. | |
| 2007/0151363 A1 | 7/2007 | Ramsesh | |
| 2008/0010966 A1 | 1/2008 | Taware et al. | |
| 2008/0034753 A1 | 2/2008 | Furman et al. | |
| 2009/0178490 A1 | 7/2009 | Konzelmann et al. | |
| 2010/0288055 A1 | 11/2010 | Mueller et al. | |
| 2012/0002035 A1 * | 1/2012 | Li | F01D 17/085 348/82 |
| 2012/0150413 A1 * | 6/2012 | Bunce | F02C 9/28 701/100 |
| 2012/0204620 A1 | 8/2012 | Straub, Jr. | |
| 2014/0130606 A1 | 5/2014 | Schwarz | |
| 2014/0144156 A1 * | 5/2014 | Lang | G01K 11/24 60/793 |
| 2015/0063411 A1 * | 3/2015 | DeSilva | G01K 11/24 374/119 |
| 2015/0128723 A1 | 5/2015 | Satou et al. | |
| 2015/0168190 A1 | 6/2015 | DeSilva et al. | |
| 2015/0168230 A1 | 6/2015 | DeSilva et al. | |
| 2015/0185089 A1 | 7/2015 | DeSilva et al. | |
| 2015/0260557 A1 * | 9/2015 | DeSilva | G01F 1/66 702/48 |
| 2015/0260611 A1 | 9/2015 | DeSilva et al. | |
| 2015/0260612 A1 | 9/2015 | DeSilva et al. | |

FOREIGN PATENT DOCUMENTS

| | | |
|---|---|---|
| EP | 1602904 A1 | 5/2005 |
| EP | 2290343 A2 | 3/2011 |
| JP | 2001141578 A | 5/2001 |
| JP | 2002156294 A | 5/2002 |
| WO | 93/04343 A1 | 3/1993 |
| WO | 2015/164313 A1 | 10/2015 |
| WO | 2015/164466 A1 | 10/2015 |

OTHER PUBLICATIONS

All citations of non-patent literature are of related applications before the US Patent and Trademark Office: "Active Temperature Monitoring in Gas Turbine Combustors", filed Dec. 18, 2013, U.S. Appl. No. 14/132,001.

"Temperature Measurement in a Gas Turbine Engine Combustor", filed Mar. 14, 2013, U.S. Appl. No. 13/804,132.

"Active Measurement of Gas Flow Velocity or Simultaneous Measurement of Velocity and Temperature, Including in Gas Turbine Combustors", filed concurrently herewith, US 2015/0168190: related application.

"Multi Functional Sensor System for Gas Turbine Combustion Monitoring and Control" filed Dec. 18, 2013, U.S. Appl. No. 14/109,992.

"Gas Turbine Engine Control Using Acoustic Pyrometry", filed Dec. 14, 2010, U.S. Appl. No. 12/967,148, Publication No. US2012/0150413.

John A. Kleppe, Jim Maskaly and Gary Beam, "The Application of Image Processing to Acoustic Pyrometry," Proceedings, Int'l Conf. on Image Processing (IEEE) (1996).

G.Q. Shen, L.S.An, and G.S. Jiang, "Real-time Monitoring on Boiler Combustion Based on Acoustic Measurement", Power India Conference, (IEEE) (2006).

Helmut Sielschott and Willy Derichs, "Use of collocation methods under inclusion of a priori information in acoustic pyrometry", Process Tomography—95 Implementation for Industrial Processes, Proc. European Concerted Action on Process Tomography, Bergen, Norway, Apr. 6-8, 1995.

International Search Report for International Application No. PCT/US2015/027020 mailed Jul. 16, 2015, 4 pages.

Written Opinion for International Application No. PCT/US2015/027020 mailed Jul. 16, 2015, 7 pages.

International Search Report for International Application No. PCT/US2015/026784 mailed Jun. 29, 2015, 3 pages.

Written Opinion for International Application No. PCT/US2015/026784 mailed Jun. 29, 2015, 7 pages.

* cited by examiner

ACTIVE MEASUREMENT OF GAS FLOW TEMPERATURE, INCLUDING IN GAS TURBINE COMBUSTORS

CROSS-REFERENCE TO RELATED APPLICATIONS

This application is a continuation in part of United States Patent Application entitled "Active Temperature Monitoring In Gas Turbine Combustors", filed on Dec. 18, 2013, Ser. No. 14/132,001 and issued as U.S. Pat. No. 9,453,767 on Sep. 27, 2016.

This application incorporates by reference the following co-pending U.S. utility patent applications in their entirety as if fully set forth herein:

"Active Measurement Of Gas Flow Velocity Or Simultaneous Measurement Of Velocity And Temperature, Including In Gas Turbine Combustors, filed concurrently herewith, Ser. No. 14/207,803, U.S. Patent Publication No. 2015/0168190;

"Multi Functional Sensor System For Gas Turbine Combustion Monitoring And Control" filed on Dec. 18, 2013, Ser. No. 14/109,992, U.S. Patent Publication No. 2015/0168228;

"Temperature Measurement in a Gas Turbine Engine Combustor", filed on Mar. 14, 2013, Ser. No. 13/804,132, U.S. Patent Publication No. 2014/0278200; and "Gas Turbine Engine Control Using Acoustic Pyrometry", filed on Dec. 14, 2010, Ser. No. 12/967,148, U.S. Patent Publication No. 2012/0150413 and issued as U.S. Pat. No. 8,565,999 on Oct. 22, 2013.

This application also incorporates by reference in its entirety as if fully set forth herein U.S. Pat. No. 7,853,433, "Combustion Anomaly Detection Via Wavelet Analysis of Dynamic Sensor Signals", issued Dec. 14, 2010.

BACKGROUND OF THE INVENTION

1. Field of the Invention

The invention relates to active measurement of gas flow temperature, such as combustion gas flow in combustors of gas turbine engines. Such engines include, by way of example, industrial gas turbine (IGT) engines, other types of stationary gas turbine, marine, aero and other vehicular gas turbine engines. More particularly, embodiments of temperature measurement methods and apparatus disclosed herein utilize a common sensing and control system for combustor velocity and temperature determination. In embodiments disclosed herein a circumferential and axially spaced array of acoustic sensors, acoustic transmitters and/or transceivers are utilized for real-time active combustor gas flow temperature measurement. Gas flow temperature data are used for engine combustion monitoring and control.

2. Description of the Prior Art

Combustion turbines, such as gas turbine engines for any end use application, generally comprise a compressor section, a combustor section, a turbine section and an exhaust section. In operation, the compressor section inducts and compresses ambient air. The combustor section generally may include a plurality of combustors for receiving the compressed air and mixing it with fuel to form a fuel/air mixture. The fuel/air mixture is combusted by each of the combustors to form a hot working gas that may be routed to the turbine section where it is expanded through alternating rows of stationary airfoils and rotating airfoils and used to generate power that can drive a rotor. The expanding gas exiting the turbine section can be exhausted from the engine via the exhaust section.

Combustion anomalies, such as flame flashback, have been known to occur in combustion sections of gas turbine engines. Flame flashback is a localized phenomenon that may be caused when a turbulent burning velocity of the air and fuel mixture exceeds an axial flow velocity in the combustor assembly, thus causing a flame to anchor onto one or more components in/around the combustor assembly, such as a liner disposed around the combustion chamber. The anchored flame may burn through the components if a flashback condition remains for extended periods of time without correction thereof. Thus, flame flashback and/or other combustion anomalies may cause undesirable damage and possibly even destruction of combustion engine components, such that repair or replacement of such components may become necessary.

The fuel/air mixture at the individual combustors is controlled during operation of the engine to maintain one or more operating characteristics within a predetermined range, such as, for example, to maintain a desired efficiency and/or power output, control pollutant levels, prevent pressure oscillations and prevent flameouts. In a known type of control arrangement, a bulk turbine exhaust temperature may also be monitored as a parameter that may be used to monitor the operating condition of the engine. For example, a controller may monitor a measured turbine exhaust temperature, and a measured change in temperature at the exhaust may result in the controller changing an operating condition of the engine. In other known types of control arrangements discrete pitot-static or multi hole pressure probes are utilized to determine gas flow velocity at specific locations, but grid arrays of such probes disrupt gas flow and introduce measurement errors. Due to such gas flow disruptions grid arrays, when employed, have limited numbers of widely spaced probes, which provide relatively coarse gas flow velocity distribution and profile information.

At present, there are several different types of sensors and sensing systems that are being used in the industry for monitoring combustion and maintaining stability of the combustion process for engine protection. For example, dynamic pressure sensors are being used for combustion stability and resonance control. Passive visual (optical visible light and/or infrared spectrum) sensors, ion sensors and Geiger Mueller detectors are used to detect flame on/off in the combustor, while thermocouples are being used for flashback detection. With respect to known combustion gas flow velocity (u) monitoring methods, pitot-static and multi hole pressure probes utilize differential pressure techniques, hot wire probes utilize thermal anemometry techniques, while Laser Doppler and Particle Image Velocimetry systems utilize optical techniques to characterize gas flow velocities. Differential pressure and thermal anemometry instruments are intrusive point measurement devices that disturb local gas flow around the instruments. Laser Doppler and Particle Image Velocimetry instruments respectively provide non-intrusive point and 2- or 3-dimensional non-intrusive gas flow velocity measurement although they both require particle seeding of the flow. In addition, sophisticated laser based measurements such as Filtered Rayleigh Scattering (FRS) and other such laser spectroscopy based techniques have been deployed to measure gas velocity. However, these techniques are more complex than intrusive differential pressure or thermal anemometry instruments and require more specialized training to implement in monitoring systems. Moreover, most optical techniques for velocity are geared towards laboratory environments rather than in operative engines at power plant field sites. With respect to temperature (T) monitoring techniques, known Raman Spectroscopy, Laser Induced Fluorescence (for both u and T monitoring), and Coherent Anti-Stokes Raman Spectroscopy (CARS) (for both u and T monitoring) instrumentation systems are also intended for laboratory environments, rather than for field use in fossil power generation equipment. Tunable Diode Laser Absorption Spectroscopy (TDLAS) instrumentation is used in some industrial power generation field applications, such as for temperature measurement in boilers but that instrumentation is extremely costly: approximately US $500,000 per system. Other types of temperature measurement and combustion anomaly detection systems have had greater acceptance in power generation industry field applications.

Particularly, U.S. Pat. No. 7,853,433 detects and classifies combustion anomalies by sampling and subsequent wavelet analysis of combustor thermoacoustic oscillations representative of combustion conditions with sensors, such as dynamic pressure sensors, accelerometers, high temperature microphones, optical sensors and/or ionic sensors. United States Publication No. US2012/0150413 utilizes acoustic pyrometry in an IGT exhaust system to determine upstream bulk temperature within one or more of the engine's combustors. Acoustic signals are transmitted from acoustic transmitters and are received by a plurality of acoustic receivers. Each acoustic signal defines a distinct line-of-sound path between a corresponding transmitter and receiver pair. Transmitted signal time-of-flight is determined and processed to determine a path temperature. Multiple path temperatures can be combined and processed to determine bulk temperature at the measurement site. The determined path or bulk temperature or both can be utilized to correlate upstream temperature in the combustor. Co-pending U.S. utility patent application Ser. No. 13/804,132 calculates bulk temperature within a combustor, using a so-called dominant mode approach, by identifying an acoustic frequency at a first location in the engine upstream from the turbine (such as in the combustor) and using the frequency for determining a first bulk temperature value that is directly proportional to the acoustic frequency and a calculated constant value. A calibration second temperature of the working gas is determined in a second location in the engine, such as the engine exhaust. A back calculation is performed with the calibration second temperature to determine a temperature value for the working gas at the first location. The first temperature value is compared to the back calculated temperature value to change the calculated constant value to a recalculated constant value. Subsequent first temperature values at the combustor may be determined based on the recalculated constant value.

Thus, different adverse conditions related to combustion gas flow temperature, anomalies and velocity currently require separate sensor designs and/or separate sensing systems to detect those conditions. Known combined IGT and other types of gas turbine engine monitoring and control system sensor and detection approaches have not covered all possible adverse combustion fault detections. Installation of different types of disparate sensors and sensing systems in a single combustion turbine engine increases installation cost and maintenance expense. Also, the disparate sensors and sensing systems inherently introduce response lags and delays in the overall engine control system.

Thus, a need exists in the art for an integrated gas turbine engine monitoring and control system for measuring gas flow velocity, temperature and detecting a broad range of possible combustor failures or, more satisfactorily precursors to faults, during combustion, sharing common sensors and, if desired, a common controller.

Another need exists in the art for a gas turbine engine active velocity and temperature monitoring system that determines actual combustor temperature in real time without the need to obtain reference temperatures from other locations within the engine, such as known bulk temperature systems that back calculate combustor temperature based on temperature measurements obtained in the engine exhaust system.

An additional need exists for an active gas flow velocity and temperature monitoring system that shares sensors commonly used with combustion turbine monitoring and control systems, so that active velocity and temperature monitoring can be integrated within the monitoring and control system.

SUMMARY OF THE INVENTION

An object of embodiments of the invention is creation of an active gas flow temperature monitoring system that shares sensors commonly used with gas turbine monitoring and control systems, so that active gas flow temperature monitoring can be integrated within the monitoring and control system.

An additional object of embodiments of the invention is creation of an active gas flow temperature monitoring system that shares sensors commonly used with gas turbine monitoring and control systems, so that active gas flow temperature monitoring can be integrated within the monitoring and control system.

Another object of embodiments of the invention is creation of an integrated gas turbine monitoring and control system for detecting a broad range of possible combustor failures or, more satisfactorily precursors to faults, during combustion, sharing common sensors and, if desired, a common controller with the velocity or velocity/temperature measurement system.

Another object of embodiments of the invention is creation of a gas turbine active temperature monitoring system that determines actual combustor temperature in one or more combustors in real time without the need to obtain reference temperatures from other locations within the engine, such as known bulk temperature systems that back calculate combustor temperature based on temperature measurements obtained in the engine exhaust system.

These and other objects are achieved in one or more embodiments of the invention by active acoustic pyrometry-based gas temperature measurement systems and methods described herein. Embodiments of the temperature monitoring systems and methods are used for monitoring combustion gas within gas turbine combustors, including industrial gas turbine (IGT) combustors. These temperature monitoring systems and methods are incorporated into the turbine combustion monitoring and control system by addition of at least one acoustic transmitter or acoustic transceiver that transmits a sound wave in a line-of-sight with at least one or a plurality of acoustic sensors, such as dynamic pressure sensors. In some embodiments, sound transmission time-of-flight that is directed generally transverse to the gas flow path is measured by the controller and correlated with gas flow temperature along the line-of-sight. Similarly, sound transmission time-of-flight along two or more planar paths, including interpolation between multiple axially spaced planar paths, is correlated with temperature along the line-of-sight. Path(s) of acoustic transmission path or absolute temperature measurement. In an integrated acoustic pressure-based sensor and monitoring/control system embodiment, the controller correlates absolute active path temperatures and, if desired, velocity with acoustic transmission and time-of-flight analysis techniques. In this way a combustion monitoring and control system that incorporates embodiments of the invention can identify and classify combustion anomalies and actively control the gas turbine combustion process within the engine combustors.

Acoustic pyrometry-based active temperature monitoring is incorporated into the monitoring and control system, alone or with other embodiments described herein, by addition of an acoustic transmitter or acoustic transceiver that transmits a sound wave in a line-of-sight with at least one paired acoustic sensor or a plurality of acoustic sensors. Sound transmission time-of-flight is measured by the controller and correlated with path temperature along the line-of-sight. The active path temperatures may be processed by the controller to determine combustor bulk temperature. If there are multiple axially spaced sensor pairs interpolated active temperatures may be determined in the volume between the spaced sensor pairs. The path(s) of acoustic transmission across the combustor gas path facilitate absolute temperature measurement. In some embodiments the combustor acoustic pyrometry system is used for calibrating the passive bulk temperature measurement using the dominant mode approach. Thus the active path temperature determined by acoustic pyrometry methods can be utilized as the second or reference temperature reading for calibrating and corroborating acoustic frequency based bulk temperature monitoring systems, when they are incorporated in a common control and monitoring system.

In some embodiments all of the monitoring functions of the integrated monitoring and control system can be performed with a commonly shared array of acoustic sensors that function as both combustion dynamics thermoacoustic vibration/wave receivers and acoustic transmitters. In such an integrated thermoacoustic pressure-based sensor and monitoring/control system, the controller correlates performance of combustion thermoacoustic properties in order to identify combustion anomalies by wavelet or Fourier analysis techniques; determine bulk temperature characteristics within the combustor with dominant mode frequency analysis techniques; or determine gas flow active path absolute temperatures, within the combustor with acoustic transmission and time-of-flight analysis techniques described herein.

Embodiments of this monitoring and control system with multi-function sensors operate by evaluating dynamic pressure sensor data for combustion anomalies while also monitoring accurate combustion gas velocity or velocity/temperature continuously in real time. Once the monitoring and control system detects that there is a fault anomaly it evaluates the fault in conjunction with the monitored combustor gas velocity or velocity/temperature to classify or determine the type of fault. This system classifies various types of developing combustion anomalies, with the ability to predict flame on, flame out, flashback. The system embodiments also monitor vibratory responses and resonances (low, intermediate and high frequency dynamics) of the combustor basket. As mentioned, accurate real time, continuous active gas flow velocity or velocity/absolute path temperature monitoring and/or bulk mean temperature monitoring by embodiments of the monitoring/control system are available for optimizing engine control and performance. System embodiments herein are implemented in any type of known combustor structure, whether of can, can-annular or annular construction, to control and regulate the gas turbine combustion control process during engine operation.

Embodiments of the invention are also directed to methods for actively monitoring gas flow temperature by placing at least one first acoustic transmitter and at least one first acoustic sensor respectively oriented in upstream and downstream transverse locations in a gas flow path and in a distinct first line-of-sound path relative to each other, with the first sensor capable of generating first sensor output signals indicative of first thermoacoustic oscillations. The at least one first transmitter and the at least one first sensor are coupled to a controller that is capable of causing the at least one first transmitter to transmit first acoustic signals within the gas flow path and capable of correlating first sensor output signals with gas flow temperature. First acoustic signals are transmitted from the at least one first acoustic transmitter. The first acoustic signals from the at least one first acoustic transmitter and are received by the at least one first acoustic sensor, which in turn generates first dynamic sensor output signals that includes contributions of the received first acoustic signals. The controller determines a first time-of-flight for the first acoustic signals traveling along each of the first line of sound paths and processes the first time-of-flight for the first acoustic signals traveling along their first line of sound paths to determine respective gas flow temperature along each respective first line-of-sound path. In some embodiments the processing to determine absolute gas flow temperature includes compensation for gas specific heat ratio, gas constant and speed of sound thermodynamic influences on the first time-of-flight.

In other embodiments speed of sound compensation for thermodynamic influences on the first time-of-flight is performed. In these embodiments compensation for the speed of sound in the temperature monitoring is accomplished by substituting for the first transmitters a set of first transducers that are capable of transmitting and receiving acoustic signals, and generating output signals and substituting for the first sensors second set of transducers that are capable of transmitting and receiving acoustic signals and generating output signals. The respective at least one of the respective first and second transducers is coupled to the controller, which in turn is capable of causing either to transmit first acoustic signals within the gas flow path and capable of correlating transducer output signals time-of-flight with gas flow temperature along the transmission path. In this embodiment first acoustic signals are transmitted from the at least one first transceiver/transducer and received by the second transceiver/transducer, thereby generating first dynamic sensor output signals with the at least one second transceiver/transducer that includes contributions of the received first acoustic signals. Reversed first acoustic signals are transmitted from the at least one second transceiver/transducer and received by the first transceiver/transducer, which generates first reversed dynamic sensor output signals that includes contributions of the received reversed first acoustic signals. The controller is used to determine a first time-of-flight for the respective first and first reversed acoustic signals traveling along each of the first line of sound paths; and in turn processes the first time-of-flight for the respective first and reversed acoustic signals traveling along their respective first line of sound paths to determine the speed of sound c.

Other embodiments of the invention are directed to systems for monitoring gas flow velocity in a turbine engine, including at least one first acoustic transmitter and at least one first acoustic sensor respectively oriented in upstream and downstream transverse locations in a gas flow path of a turbine engine and in a distinct first line-of-sound path relative to each other. The first sensor is capable of generating first sensor output signals indicative of first thermoacoustic oscillations. A controller is coupled to the at least one first transmitter and the at least one first sensor that is capable of causing the at least one first transmitter to transmit first acoustic signals within the gas flow path and capable of correlating first sensor output signals time-of-flight with gas flow velocity. The correlation is performed with the controller by: transmitting first acoustic signals from the at least one first acoustic transmitter and receiving the first acoustic signals from the at least one first acoustic transmitter that in turn generates first dynamic sensor output signals with the at least one first acoustic sensor that includes contributions of the received first acoustic signals. The controller determines a first time-of-flight for the first acoustic signals traveling along each of the first line of sound paths and processes the first time-of-flight to determine respective gas flow velocity along each respective first line-of-sound path. In other embodiments the system also simultaneously monitors active gas flow temperature, with addition of at least one second acoustic transmitter and at least one second acoustic sensor respectively oriented in a common axial plane in the turbine gas flow path and in a distinct second line-of-sound path relative to each other. The second sensor is capable of generating second sensor output signals indicative of second thermoacoustic oscillations. The controller is coupled to both the second transmitter and second sensor: it is capable of causing the at least one second transmitter to transmit second acoustic signals within the gas flow path and processing the second time-of-flight for the second acoustic signals traveling along the second line of sound paths to determine respective gas flow temperature along each respective second line-of-sound path. The determined respective gas flow temperatures are used to compensate for temperature effects on the first time-of-flight. Alternatively speed of sound compensation for thermodynamic influences on the gas flow velocity are utilized to determine absolute gas flow velocity, as discussed above.

Additional embodiments of the invention are directed to a system for monitoring gas flow temperature in a turbine engine, comprising at least one first acoustic transmitter and at least one first acoustic sensor respectively oriented in upstream and downstream transverse locations in a gas flow path of a turbine engine and in a distinct first line-of-sound path relative to each other. The first sensor is capable of generating first sensor output signals indicative of first thermoacoustic oscillations. A controller is coupled to the at least one first transmitter and the at least one first sensor that is capable of causing the at least one first transmitter to transmit first acoustic signals within the gas flow path and capable of correlating first sensor output signals with gas flow temperature, by transmitting first acoustic signals from the at least one first acoustic transmitter and receiving the first acoustic signals from the at least one first acoustic transmitter and generating first dynamic sensor output signals with the at least one first acoustic sensor that includes contributions of the received first acoustic signals. First time-of-flight for the first acoustic signals traveling along each of the first line of sound paths is determined and processed for the first time-of-flight for the first acoustic signals traveling along their first line of sound paths to determine respective gas flow temperature along each respective first line-of-sound path.

Other embodiments are directed to a method for actively monitoring gas flow temperature, comprising placing at least one first acoustic transmitter and at least one first acoustic sensor respectively oriented in a common axial plane in the gas flow path and in a distinct first line-of-sound path relative to each other, with the first sensor capable of generating first sensor output signals indicative of first thermoacoustic oscillations. The at least one first transmitter and the at least one first sensor are coupled to a controller that is capable of causing the at least one first transmitter to transmit first acoustic signals within the gas flow path and capable of correlating the first sensor output signals time-of-flight with gas flow temperature. The controller processes the first time-of-flight for the first acoustic signals traveling along the first line of sound paths to determine respective gas flow temperature along each respective first line-of-sound path. At least one second acoustic transmitter and at least one second acoustic sensor are respectively oriented in a common axial plane in the gas flow path downstream of the first acoustic transmitter and sensor, and in a distinct second line-of-sound path relative to each other. The second sensor is capable of generating second sensor output signals indicative of second thermoacoustic oscillations. At least one second transmitter and the at least one second sensor are coupled to the controller, which is capable of causing the at least one second transmitter to transmit second acoustic signals within the gas flow path and capable of correlating the second sensor output signals time-of-flight with gas flow temperature. The second time-of-flight for the second acoustic signals traveling along the second line of sound paths are processed to determine respective gas flow temperature along each respective second line-of-sound path. The determined respective gas flow temperatures along each respective first and second line-of-sound path are interpolated to create a volumetric temperature map.

The respective objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
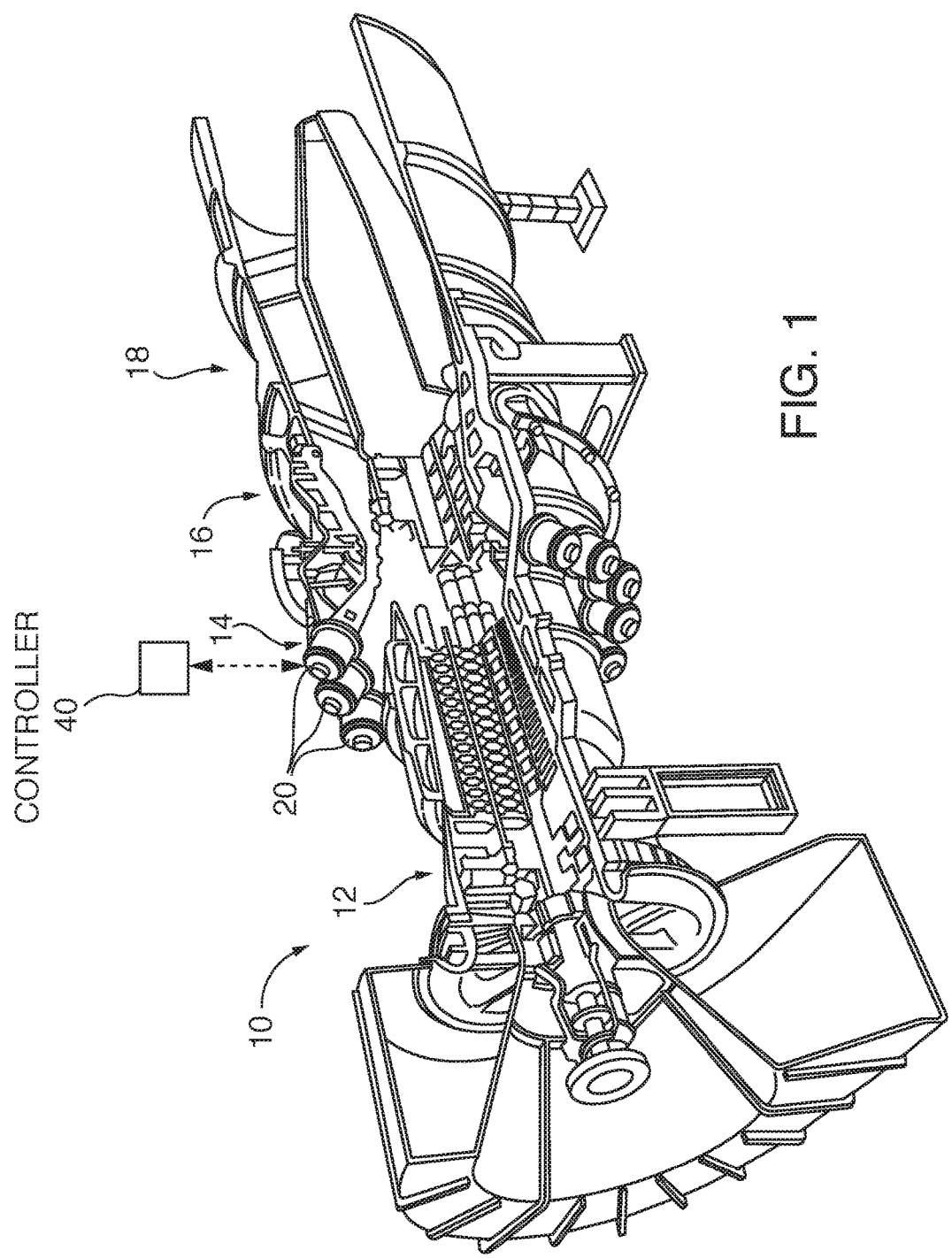
FIG. 1 is a perspective cross-sectional view of a gas turbine engine illustrating implementation of a system for determining combustor gas flow active velocity and temperature measurement, in accordance with embodiments of the invention.

After considering the following description, those skilled in the art will clearly realize that the teachings of embodiments of the invention can be readily utilized for active acoustic pyrometry-based gas flow temperature measurement. Embodiments of the invention are used for monitoring of gas turbine combustors, including industrial gas turbine (IGT) combustors by incorporating them into the combustion monitoring and control system by addition of an acoustic transmitter or acoustic transceiver that transmits sound waves through gas flow in a line-of-sight with a plurality of acoustic sensors, such as dynamic pressure sensors. For active 3-D temperature measurement, sound transmission time-of-flight that is directed generally transversely through the gas flow path is measured by the controller and correlated with gas flow temperature (or optionally velocity) along the line-of-sight. The gas flow temperature determination includes compensation for impact of the thermodynamically interrelated temperature, gas constant and speed of sound influences on the first time-of-flight, in order to determine absolute gas flow temperature.

In an integrated acoustic pressure-based sensor and monitoring/control system embodiment, the controller correlates absolute active path temperatures simultaneously with acoustic transmission and time-of-flight analysis techniques. Where velocity and temperature are measured simultaneously the absolute active path temperature is utilized to compensate for the aforementioned thermodynamic influences on gas flow absolute velocity. Alternatively in other embodiments the speed of sound influence on the first time-of-flight is utilized to determine absolute temperature. In such embodiments, compensation for the speed of sound in the absolute temperature monitoring is accomplished by substituting for the first transmitters a set of first transceiver/transducers that are capable of transmitting and receiving acoustic signals, and generating output signals and substituting for the first sensors a set of second transducers that are capable of transmitting and receiving acoustic signals and generating output signals. Acoustic signals are transmitted and received from the first to the second transducers and time-of-flight is determined. A reverse acoustic signal is transmitted from the second to the first transducers and the reverse time-of-flight is determined. The respective first and first reversed acoustic signals times-of-flight are used to determine the speed of sound c. The determined speed of sound c is then utilized for determination of the actual gas flow temperature.

In embodiments of the invention active temperature measurements are used as monitoring parameters for gas flow in a combustion monitoring and control system that can identify and classify gas flow anomalies (e.g., combustion anomalies), for example by using wavelet or Fourier analysis techniques. Some embodiments of the methods and system incorporate one or more acoustic dynamic pressure transceiver/transducer combination transmitter/sensors that are selectively oriented or arrayed in sequential axial planar positions within the combustor. Known transceiver/transducer component designs and their related controller components have been used reliably and cost effectively in the past in power generation field service. By reconfiguring those types of known components into the gas flow control and monitoring systems of the present invention combustion turbine and other combustion power generation equipment can be monitored and controlled with simpler instrumentation hardware configurations that provide detailed active gas flow velocity and temperature distribution information useful for precise combustion control.

Monitoring and Control System Structure

Figure 2:
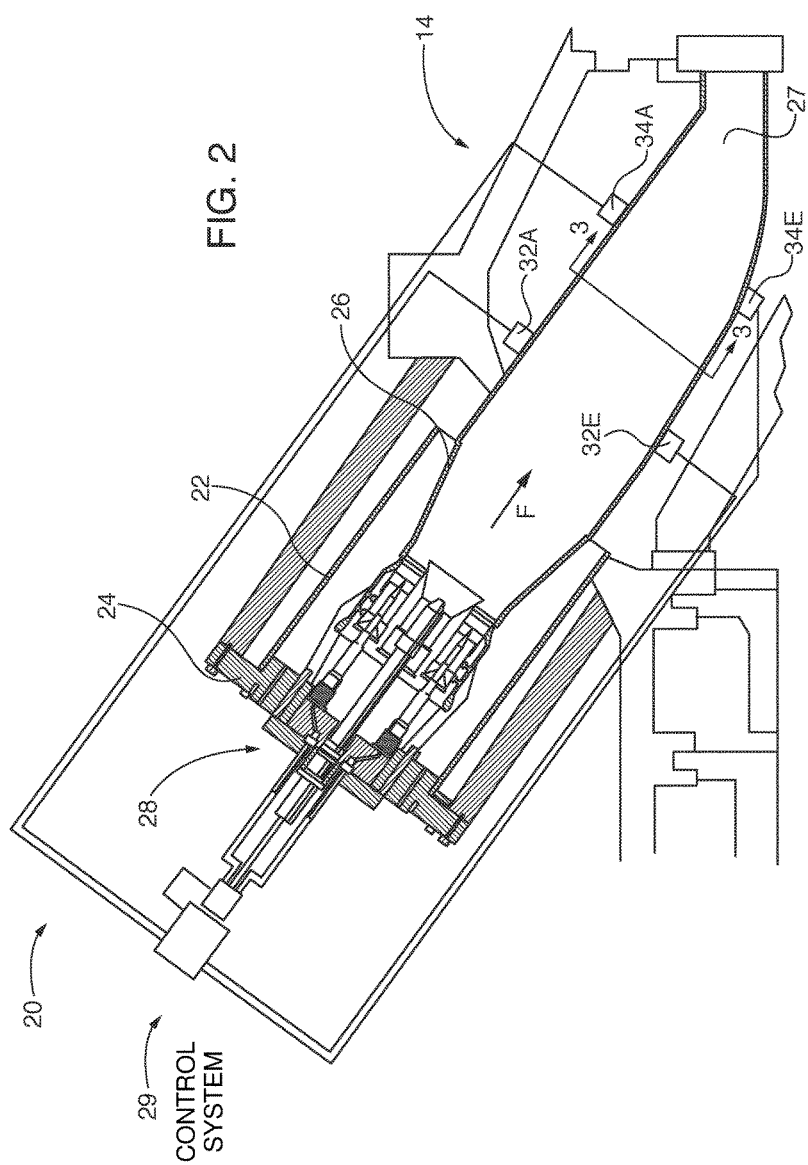
FIG. 2 is a cross-sectional view of a gas turbine combustor incorporating an embodiment of a monitoring system for determining combustor gas flow active velocity and temperature measurement, in accordance with embodiments of the invention.

Referring to FIGS. 1 and 2 an exemplary industrial gas turbine engine 10 is shown. The exemplary engine 10 includes a compressor section 12, a combustor section 14, a turbine section 16, and an exhaust section or system 18. The combustor section 14 includes a plurality of combustors 20. Each combustor 20 has a combustion shell 22 and a cover plate 24. The combustor liner or basket 26 and transition duct 27 define a passage for conveying hot working gas that flows in the direction F to the turbine section 16. The system of the present invention is operable with known combustor geometry gas turbine engine designs, including can, can-annular or annular construction combustors in stationary land-based or vehicular applications.

During operation of the engine 10, compressed air from the compressor section 12 is provided to the combustor section 14 where it is combined with fuel supplied by fuel injection system 28 in the combustors 14. The fuel/air mixture is ignited to form combustion products comprising the hot working gas. It may be understood that combustion of the fuel and air may occur at various axial locations along the passage through the combustor liner or basket 26 and the transition duct 27 to the inlet of the turbine section 16. The hot working gas is expanded through the turbine section 16 and is exhausted through the exhaust section/system 18.

Referring to FIGS. 1 and 2, in accordance with an aspect of the invention, a combustion monitoring and control system 29 is provided, which can identify and classify combustion anomalies and actively control the gas turbine combustion process within one or more of the engine 10 combustors 20. In this regard, the engine 10 may include may comprise one or more of the monitoring and control system(s) 29: e.g., one system 29 for each combustor 20, or a single system 29 may service each combustor 14 of the engine 10. Similarly, clusters of combustors 20 may be served by one system 29, with other cluster(s) being served by other systems. Thus the consolidated monitoring system for an engine 10 can determine deviations between respective combustors and compare their relative performance no matter what engine combustor structure or orientation is employed by the engine design: whether a stationary, land-based turbine engine or a vehicular engine for aero, marine or land vehicular applications.

Figure 5:
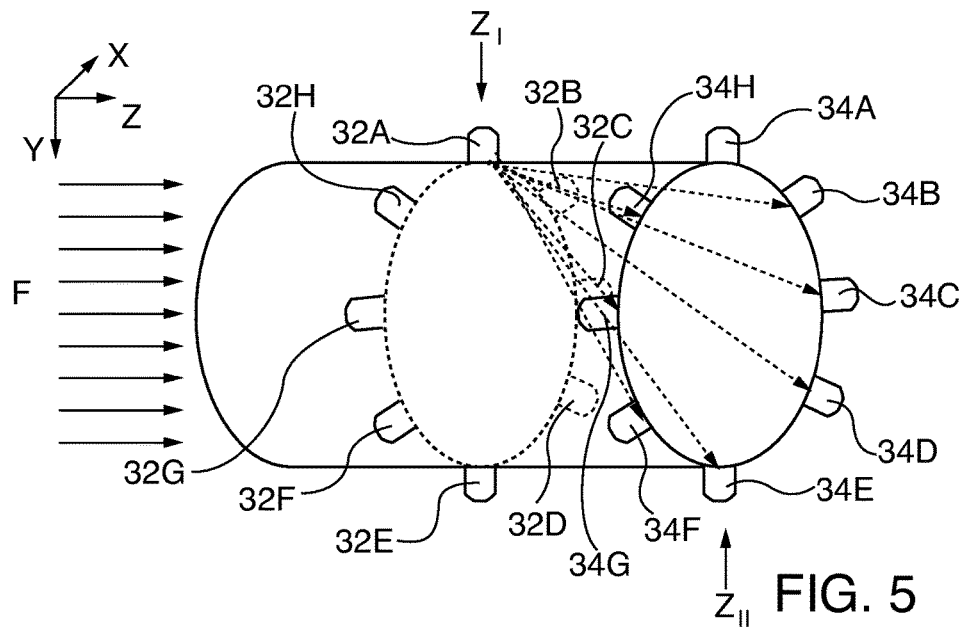
FIG. 5 is a schematic perspective view of exemplary sonic sensor arrays used by the gas flow monitoring system to measure gas flow velocity in a gas turbine combustor, in accordance with embodiments of the invention.
Figure 9:
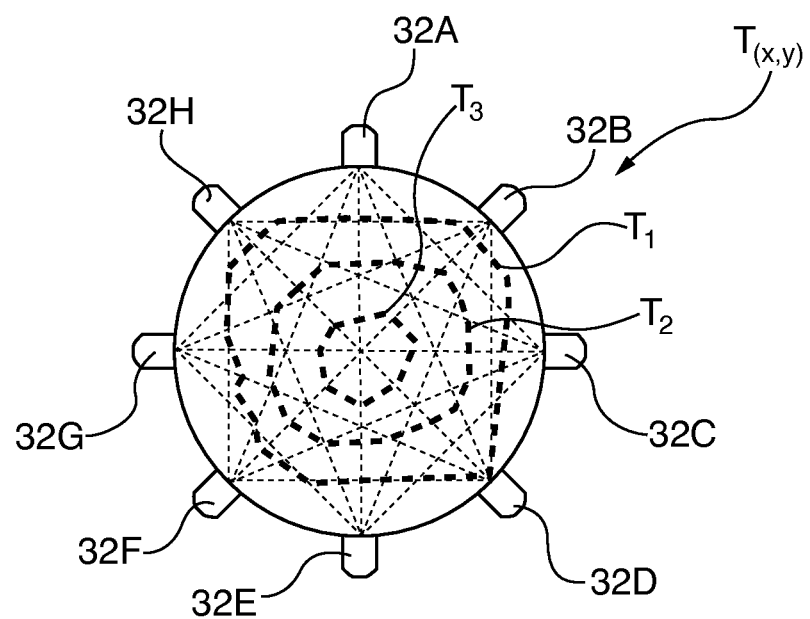
FIG. 9 is a schematic perspective view of exemplary sonic sensor arrays used to measure gas flow temperature in a gas turbine combustor, in accordance with embodiments of the invention.

As shown in FIGS. 2, 3, 5 and 9 the system 29 includes an array of a plurality of known acoustic transceiver/transducers 32A-H and 34A-H that are capable of transmitting and receiving acoustic oscillation waves along exemplary the line-of-sight paths shown in dashed lines in FIGS. 5 and 9. The transceiver/transducer arrays 32, 34 are capable of generating respective sensor output signals indicative of combustion thermoacoustic oscillations in each respective monitored and controlled combustor 20. Other system embodiments can be constructed with at least two, but preferably more acoustic sensors, whether functionally part of a transceiver component or as a stand-alone component. Acoustic frequencies and amplitudes sensed by those acoustic sensor portions of the transceivers are generated as a result of combustion events in the working combustion gas, defining acoustic sources that occur within the combustor 20 hot gas paths. The monitoring and control system 29 is configured to transform the sensed thermoacoustic oscillation information into a form that enables the occurrence of combustion anomalies of interest to be discerned. As such, flame flashback events and other types of combustion anomalies of interest may be detected and extracted from sensed thermoacoustic oscillations in the combustor 14 that are monitored by the transceiver/transducer/sensors positioned in and/or around the combustor 14. Depending upon the system 29 configurations and application, the acoustic sensors comprise any combination of one or more of a dynamic pressure sensor, a microphone, an optical sensor or an ionic turbine inlet sensor. Pressure sensors sense the amplitudes of thermoacoustic oscillations in the combustor 20 as well as pulsation frequencies. A high temperature microphone may be utilized to measure acoustic fluctuations in the combustor 14. An optical sensor may be utilized to measure a dynamic optical signal within the combustor 20. An ionic sensor may be utilized to measure dynamic ionic activity within the combustor 20.

Figure 3:
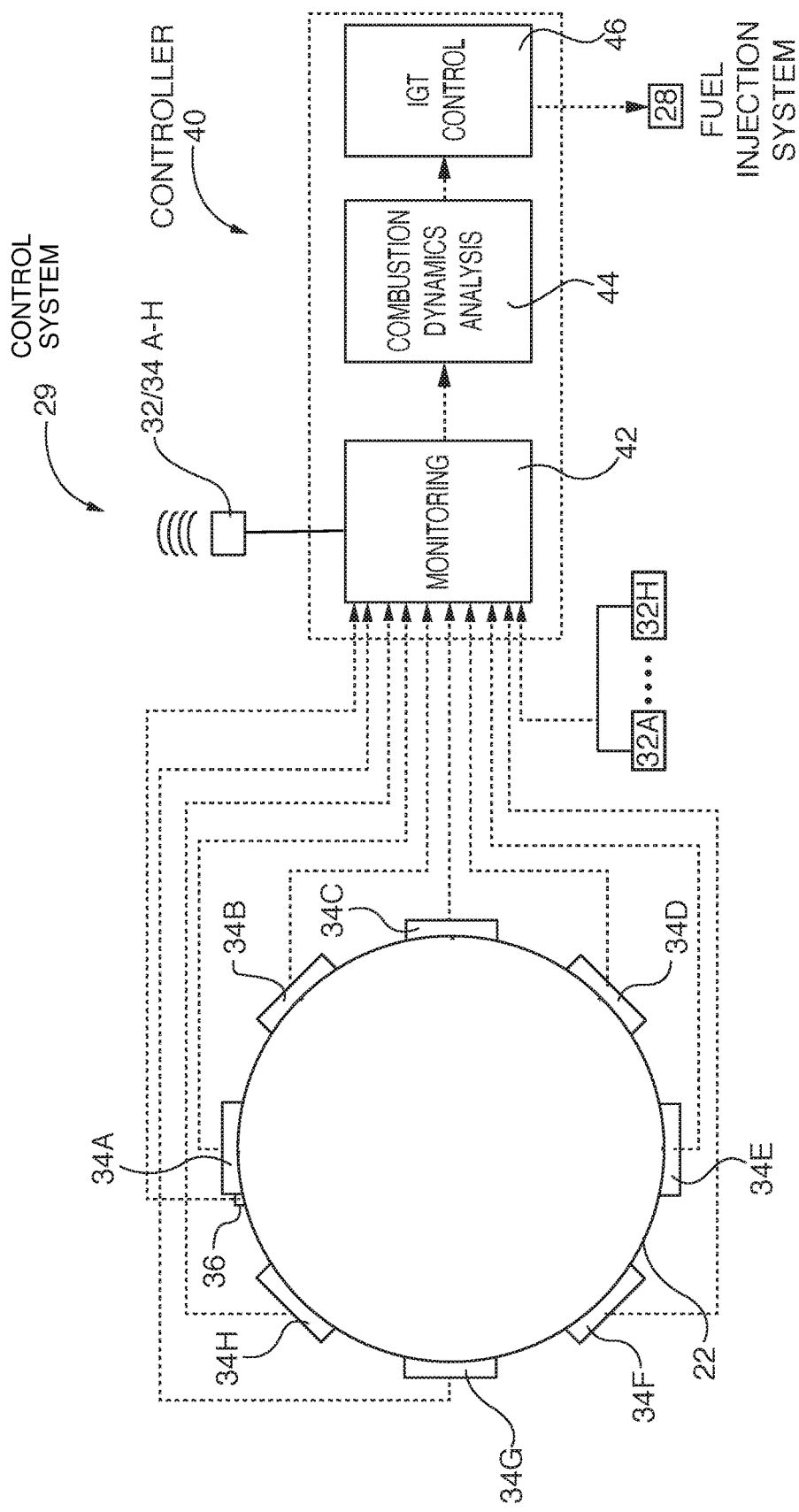
FIG. 3 is a cross-sectional view of the system of FIG. 2, taken along 3-3 thereof, in accordance with aspects of the invention.

An exemplary acoustic sensor array shown schematically in FIGS. 2, 3, 5 and 9 comprises transceiver/transducers 32A-H and 34A-H that function as at least one acoustic transmitter that transmits in turn to at least one and preferably a plurality of the dynamic pressure sensors in the array. The transceiver/transducers 32, 34 are arrayed axially and radially within the combustor 20 by known mounting structures and methods, such as J tubes or rakes, within the combustor shell 22 proximal the combustor basket or liner 26, and/or proximal the transition 27 junction with the turbine section 16. In FIG. 3 the sensors are radially/circumferentially arrayed transceivers 34A-34H that are capable of transmitting and receiving acoustic oscillation waves along the line-of-sight paths similar to the transceivers 32A-H shown in dashed lines in FIG. 9. Other types of known sensors, such as individual thermocouple temperature sensors or thermocouple arrays may be employed within the gas turbine engine. For example in FIG. 3 thermocouple 36 measures combustion temperature in the combustor 20. While exemplary three-dimensional annular combustion flow paths and axially spaced, two-dimensional circular-annular transceiver/transducer arrays are shown in the figures, other combustion flow path and array orientations may be utilized, in practicing embodiments of the invention, including square- or rectangular-shaped geometries.

Figure 4:
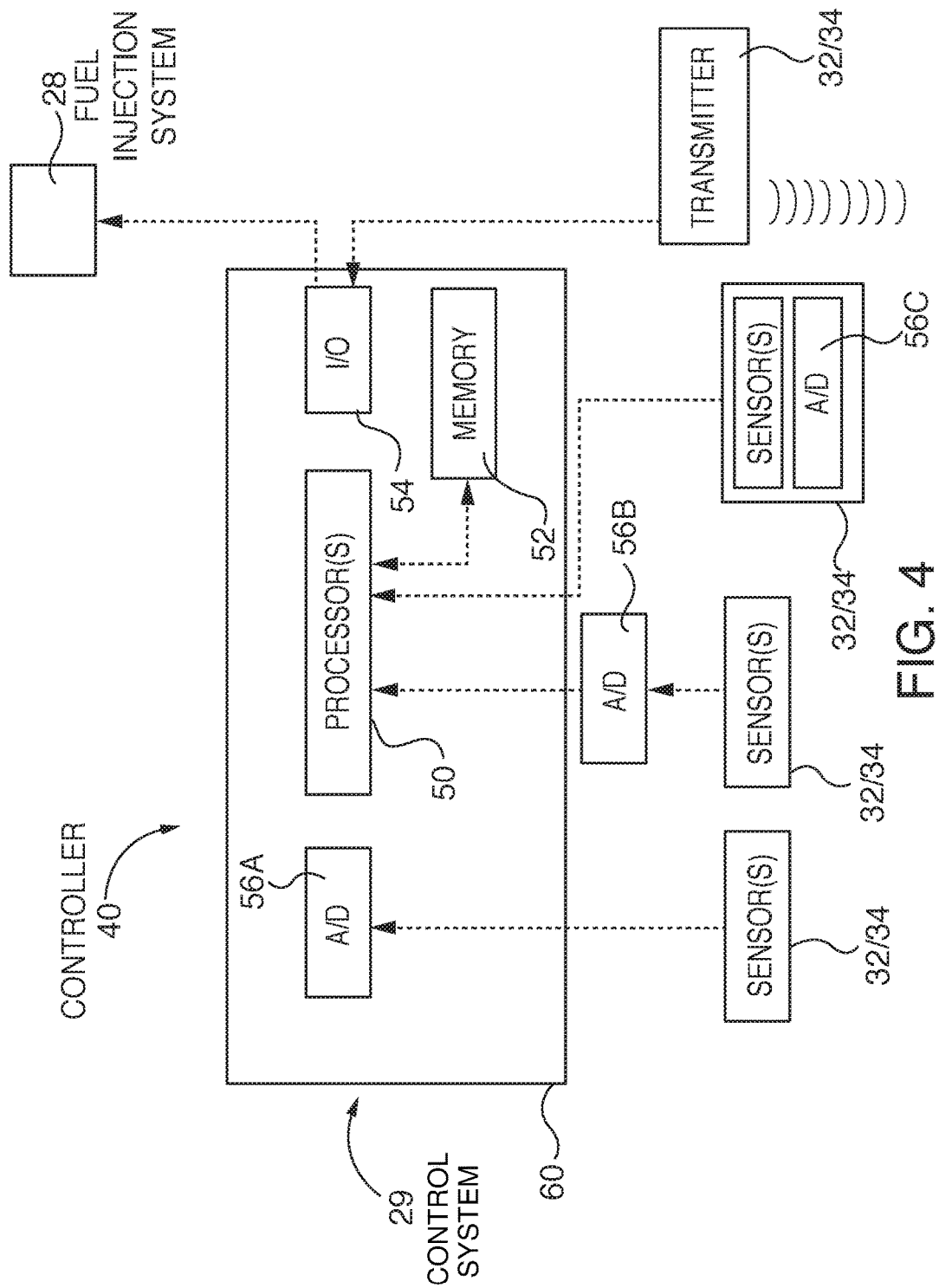
FIG. 4 is a block diagram of an embodiment of a controller for implementing embodiments of the present invention in the monitoring system for determining combustor gas flow active velocity and temperature measurement, in accordance with embodiments of the invention.

As shown in greater detail in FIGS. 3 and 4, the monitoring and control system 29 comprises a known controller 40, coupled to the transceiver/transducers 32, 34, that is capable of correlating sensor output signals with gas flow velocity and combustion temperature in a monitoring section 42 and conducting combustion dynamics analysis of the combustion process in an analysis section 44. The monitoring section 42 and dynamic analysis 44 section outputs are utilized by the gas turbine control system 46 that can send control signals to other gas turbine controls subsystems, including industrial gas turbine (IGT) controls subsystems, such as the fuel injection system 28, in order to unload or shut down the engine 10 in response to changes in monitored combustion conditions within the combustor 20.

Referring to the exemplary controller 40 embodiment shown in FIG. 4, it includes one or more processors 50, system memory 52 and input/output control devices 54 for interfacing with the associated engine 10 controls, such as the fuel injection control system 28, and the acoustic transceiver/transducer 32, 34 acoustic transmitters and sensors 32 (or functionally equivalent performing separate discrete transmitters and receiver sensors), networks, other computing devices, human machine interfaces for operator/users, etc. The controller 40 may also include one or more analog to digital converters 56A and/or other components necessary to allow the controller 40 to interface with the transceivers 32, 34 and/or other system components to receive analog sensor information. Alternatively, and/or additionally, the system 29 may include one or more analog to digital converters 56B that interface between the transceivers 32, 34 (or functionally equivalent performing separate discrete transmitters and receiver sensors) and the controller 40. As yet a further example, certain transceivers 32, 34 may have an analog to digital converter 56C integral therewith, or are otherwise able to communicate digital representations of sensed information directly to the controller 40

The processor(s) 50 may include one or more processing devices such as a general purpose computer, microcomputer or microcontroller. The processors 50 may also comprise one or more processing devices such as a central processing unit, dedicated digital signal processor (DSP), programmable and/or reprogrammable technology and/or specialized component, such as application specific integrated circuit (ASIC), programmable gate array (e.g., PGA, FPGA).

The memory 52 may include areas for storing computer program code executable by the processor(s) 50, and areas for storing data utilized for processing, e.g., memory areas for computing wavelet transforms, Fourier transforms or other executed mathematical operations used to operate the monitoring and control system 29, as described more fully herein below. As such, various aspects of the present invention may be implemented as a computer program product having code configured to perform the detection of combustion engine anomalies of interest, combustion dynamics and engine control functions as set out in greater detail herein.

In this regard, the processor(s) 50 and/or memory 52 are programmed with sufficient code, variables, configuration files, etc., to enable the controller 40 to perform its designated monitoring and control functions. For example, the controller 40 may be operatively configured to sense thermoacoustic conditions, analyze thermoacoustic conditions based upon inputs from one or more transceiver/transducers 32, 34, control features of the engine 10 in response to its analysis, and/or report results of its analysis to operators, users, other computer processes, etc. as set out in greater detail herein. Thus, all of the dynamic output signals originating from transceiver/transducers 32, 34 may be communicated to a single processor 50. In this implementation, the single processor 50 will process the sensor dynamic output signals using the data analysis and control functions described in greater detail herein, such that it appears as if the results are computed in a generally parallel fashion. Alternatively, more processors 50 can be used and each processor may be utilized to process one or more transceiver/transducers 32, 34 dynamic signals, e.g., depending for example, upon the computation power of each processor.

Monitoring and Control System Operation

Figure 10:
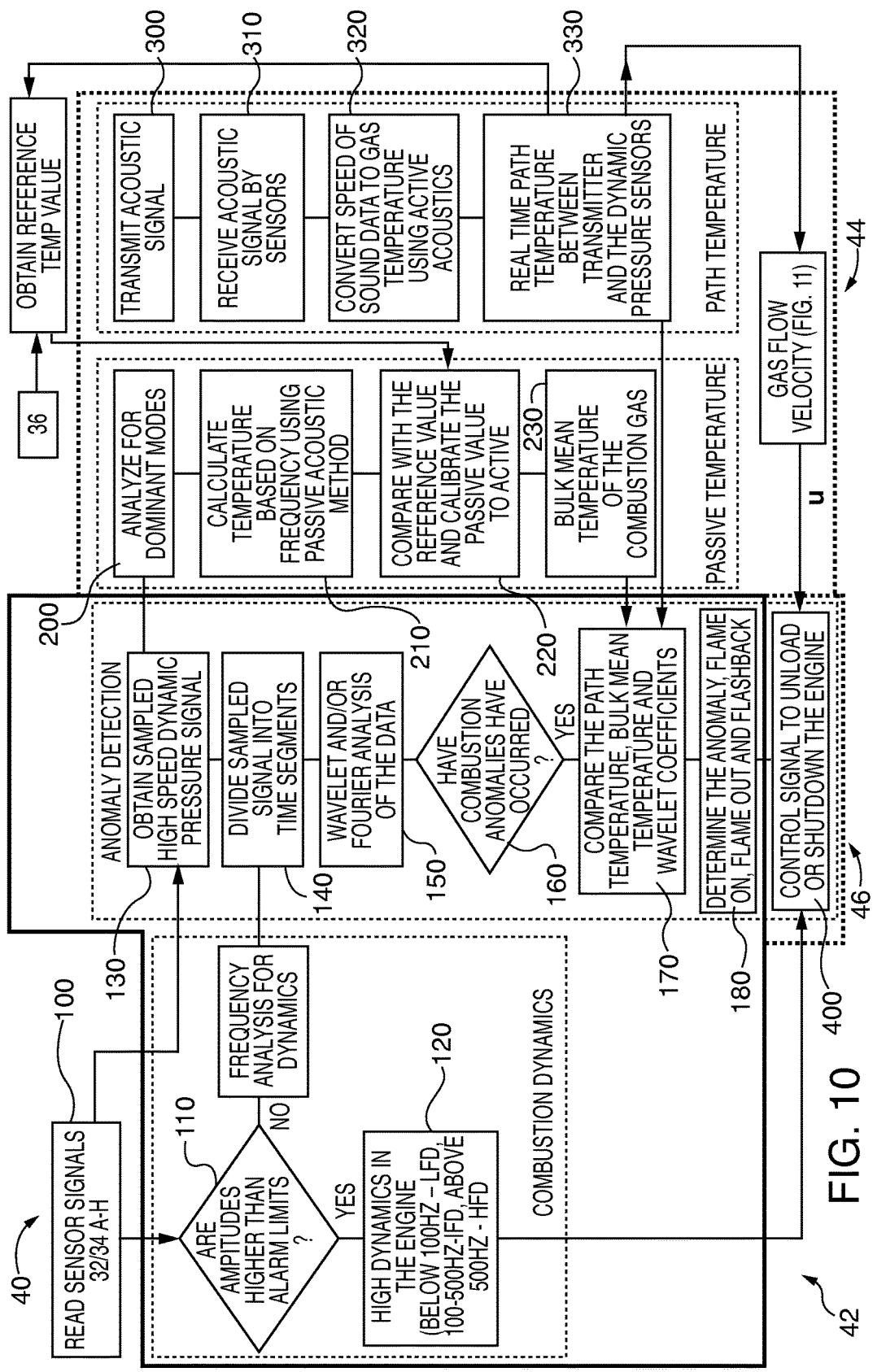
FIG. 10 is a flow chart illustrating implementation of an embodiment of the methods for measuring gas flow velocity and temperature active measurement in a gas turbine combustor, in accordance with embodiments of the invention.
Figure 11:
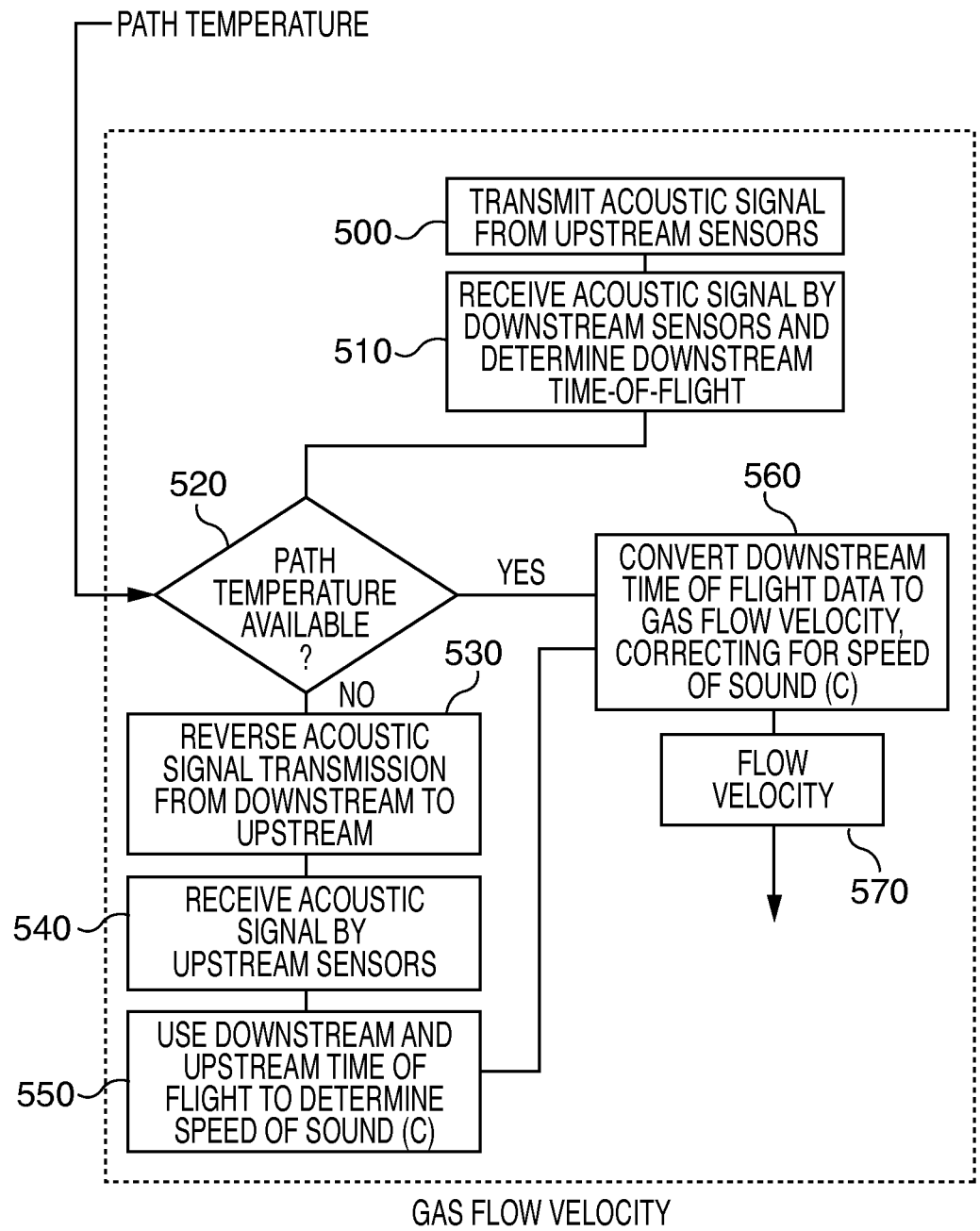
FIG. 11 is a flow chart illustrating implementation of an embodiment of the method for measuring active gas flow velocity, in accordance with embodiments of the invention.

The concepts of acoustic temperature and velocity measurements are both based on creating a sonic wave, listening to it across the gas stream and finding an average speed of sound across a given path, which is then descriptive for the gas velocity or velocity/temperature. FIGS. 10 and 11 are flow charts illustrating graphically exemplary operation of a monitoring and control system 29 embodiment of the invention that actively monitors and measures both gas flow velocity and temperature using acoustic measurement methodologies. The thick solid and dotted line operational blocks relate to previously described combustion dynamics analysis 42 (solid block), temperature monitoring and determination 44 and gas turbine control 46 functions (including by way of example IGT control functions) that are performed within the controller 40. In step 100 sensor signals generated by the sensor components within the transceiver/transducers 32A-H, 34A-H are read. In step 110 amplitudes of one or more of the sensor signals are compared to previously established alarm limits. For example in IGT applications the step 120 low frequency dynamics (LFD) below 100 Hz are of importance because of potential resonance influence at the 50 Hz or 60 Hz engine rotational speed. Other frequency bands of interest are intermediate frequency dynamics (IFD) between approximately 100-500 Hz and high frequency dynamics (HFD) above 500 Hz. If an alarm limit is exceeded the controller 40 sends a control command, for example to the fuel injection system 28, to unload or shut down the engine 10 in step 400.

If an alarm limit is not exceeded in step 110, then frequency analysis for dynamics is performed in anomaly detection portion of the combustion dynamics analysis subsystem. An exemplary description of how to perform anomaly detection is in U.S. Pat. No. 7,853,433 that is incorporated herein by reference. The sampled high speed dynamic pressure signal is obtained from the sensors in step 130 and time divided into segments in step 140. In step 150 the time-frequency divided sample segments are analyzed using the wavelet analysis technique described in U.S. Pat. No. 7,853,433. Alternatively, a known Fourier spectral analysis that converts the time segments into frequency space, analyzes dominant frequencies by identifying the peak frequencies and their respective amplitudes, and identifies amplitudes exceeding defined thresholds. If it is determined that a combustion anomaly or anomalies have occurred in step 160 the combustor temperature as determined in the temperature monitoring and determination subsystem 44 is compared with the anomaly information obtained by the Fourier or wavelet analysis techniques, or both. In step 180 the anomaly classification as a flame on, flame out or flashback is made in conjunction with the passive or path temperature information obtained from the temperature monitoring and determination subsystem 44. For example in a gas turbine flameout the combustor temperature drops off dramatically. Conversely in a flashback scenario the combustor temperature rises dramatically upstream within the combustor 14. When the anomaly determination is made in step 180 appropriate control signals to unload or shut down the engine are made in the engine control system 46.

The temperature monitoring and determination subsystem 44 may comprise passive temperature determination utilizing the passive acoustic method described in U.S. Patent Application "Temperature Measurement in a Gas Turbine Engine Combustor: filed on Mar. 14, 2013, Ser. No. 13/804,132, incorporated by reference herein, and/or real time actual path temperature determination within the combustor 14. Real time actual path temperature is determined by adaptation of the 2-D planar acoustic pyrometry technique for gas turbine exhaust system temperature determination described in United States Patent Publication No. US2012/0150413 (also incorporated by reference herein) or by a 3-D technique that determines one or more path temperatures between the sensor arrays 32/34 of FIG. 5, that is further described in greater detail herein.

In the passive temperature determination method, sampled high speed dynamic pressure signals from the transceiver/transducers 32/34, such as obtained in step 130 are analyzed for dominant modes in step 200. Combustor temperature is calculated based on frequency using the passive acoustic method in step 210. The passive value is calibrated with a reference temperature value in step 220 in order to obtain an active temperature value within the combustor 14. The calibrated passive temperature value determined in step 220 is utilized in step 230 to determine the bulk mean temperature of the combustion gas in step 230. The reference temperature value used in step 220 may be obtained from one or more thermocouples 36 in the combustor or thermocouples located in the exhaust system 18 (not shown). The reference temperature value may be an actual path temperature measured in the exhaust system 18, as described in United States Patent Publication No. US2012/0150413 or a real time path temperature measured in the combustor 14 that is determined in steps 300-330.

The 2-D real time path temperature is measured by transmitting one or more acoustic signals in an acoustic transceiver/transducer 32, 34 or other discrete transmitter, such as in the 2-D planar pattern shown for the (n=8+ transceiver/transducers 32A-H in FIG. 9. For example, transceiver/transducer 32A transmits a signal that is received by the remaining (n−1) transceiver/transducers 32B-H and the time-of-flight for each line-of-sight path is determined. However, at least one, preferably two or more sensor elements in the remaining transceiver/transducers 32B-H receive the acoustic signal(s) in step 310. Preferably in practice several transceiver/transducers (transmit and receive acoustic signals) circling one plane such that the paths between all transceivers form a grid with desired coarseness which results in the spatial resolution of the temperature measurement. For example, for a cylindrical combustor the transceivers could be equally spaced around the periphery as shown in FIGS. 3 and 9. These could be either fired sequentially (one at a time) or simultaneously with disjoint sound patterns that can be readily differentiated. For sequential firing one transceiver is creating sounds while all remaining transceivers record it to estimate the travel time for the respective paths. Each of these line-of-sight paths represents an average temperature along that path. The average temperatures over different paths are combined to a two-dimensional map shown in FIG. 9, using a known computer tomography technique.

The 2-D time-of-flight sound data are converted to gas temperature using active acoustics in step 320, such as by utilization of the methods described in the aforementioned United States Patent Publication No. US2012/0150413 that is incorporated by reference herein. The real time path temperature that is determined in step 330 is the localized active temperature value along the line-of-sight transmission path. A plurality of active temperature values measured along different acoustic paths by performing the steps 300-330 can be utilized to determine the combustor 14 bulk temperatures, alone or in parallel with the dominant frequency passive acoustic method of steps 200-230. While a single path active temperature measurement between a single transmitter 30 and acoustic sensor 32 provides useful control information, arraying a plurality of transceiver/transducers 32, 34 selectively in any axial, circumferential and/or radial pattern or combinations thereof within a combustor 14 (see, e.g., FIG. 2, 3, 5, or 9) or in a series of combustors 14 facilitates active real time two- or three-dimensional combustion temperature monitoring within the gas turbine engine 10.

The 2-D or 3-D real time path temperature determined in steps 300-330 can be utilized as an input for other monitoring and control functions, with or without one or more of the combustion dynamics analysis 42, passive temperature monitoring and determination 44 and control 46 functions described in the exemplary integrated monitoring and control system 29 described herein. For example combustor turbine inlet temperature (TIT) can be actively monitored in real time and used as a control parameter for the combustion process. The combustion active path temperature determined in steps 300-330 can be utilized to control the fuel/air mixture in the combustor 14 via the fuel injection system 28. The real time path active temperature can be utilized as an input for active actual gas flow velocity measurement in an industrial gas turbine combustor or in other types of gas flow environments.

Embodiments of the present invention measure 3-D gas flow velocity and/or gas flow temperature by correlation with sonic time-of-flight along a line-of-sight sonic pathway between axially spaced, transversely oriented sonic transmitter and sensor (or transceiver/transducers incorporating the sensors and transmitters), so that the line-of-sight along the pathway is oriented transverse, as opposed to parallel to the gas flow path. In order to determine gas flow absolute velocity, the time-of-flight data are corrected or compensated for thermodynamic influences on gas temperature, gas constant and speed of sound. As noted above gas temperature along a line of sight can be determined using the real time active path temperature or temperature independently obtained from another measurement device (e.g., thermocouple 36). Alternatively localized speed of sound c can be determined by measuring bi-directional time-of-flight (i.e., forward/downstream transmission and reverse/upstream transmission). The aforementioned thermodynamic influences are governed by the known equation:

$$c(x,y,z) = (\gamma \cdot R \cdot T)^{1/2}$$

Where:
$c(x,y,z)$ is the isentropic speed of sound;
$\gamma$ is specific heat ratio;
R is the gas constant; and
T is the gas temperature.
Therefore, once the speed of sound along a path is known, the average path temperature and absolute velocity can be determined utilizing embodiments of the invention further described herein.

For accurate absolute velocity or temperature measurement, two planes of transceiver/transducers 32, 34 are oriented in axially spaced, opposed relationship within the gas flow, as shown in FIG. 5. The two transceiver/transducer planes 32, 34 are preferably apart by approximately the same order of magnitude as the diameter (circular) or width (square or rectangular) of the monitored gas flow geometry. That is, the axial distance between the two planes should be determined according to the geometry and scale of the interrogated environment as well as the anticipated or possible ranges of gas flow gas constant, temperature and velocity.

Figure 8:
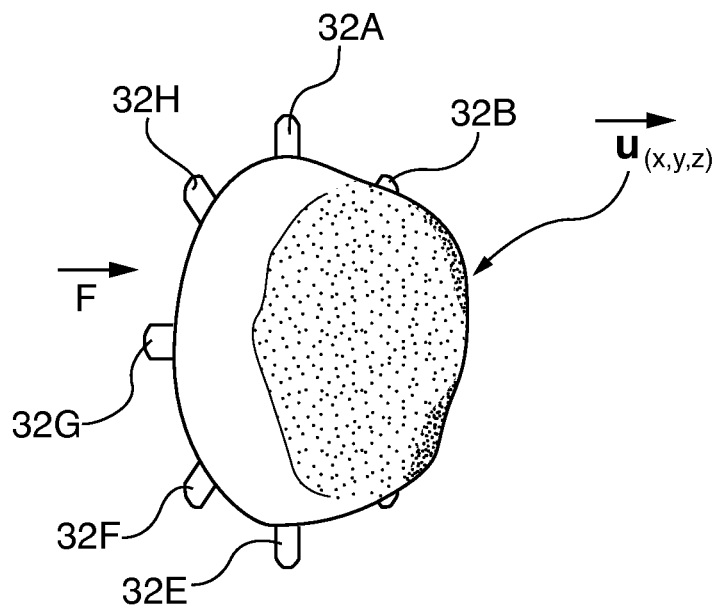
FIG. 8 is a composite gas flow velocity profile of the respective velocities measured by the gas flow velocity monitoring system, in accordance with embodiments of the invention.

For gas flow velocity estimation, the gas flow is measured axially and transverse to the flow direction. For example, when transceiver/transducer 32A in plane $Z_I$ fires or transmits a signal, all transceiver/transducers 34B-H in plane $Z_{II}$ that are not parallel-aligned with the signal firing sensor will be listening, thereby creating several paths across the gas flow (n−1 paths for n sensors). The signal transmitting/receiving firing process continues sequentially with the second transceiver/transducer 32B on plane $Z_I$ firing to the remaining (n−1) transceiver/transducers 34A and 34C-H, which receive that transmitted signal. The transmitted signal firing will continue on with the consecutive transceivers firing and creating n−1 paths for each firing. In the embodiment of FIG. 5, having 8 transceivers/transducers in each of the two axially spaced arrays there are a total of 64 paths in three dimensions. In addition, to alleviate the directional ambiguity of the velocity (to identify reverse flows and perhaps turbulence fluctuations in reverse direction) the same process will be repeated with transducer/transceivers 34 in plane $Z_{II}$ firing and transceiver/transducers in plane $Z_I$ receiving the reverse direction transmitted acoustic signal, assuming that the gas flow temperature is already known. Instead of transmitting/firing acoustic signals sequentially from each transceiver/transducer, a sound pattern with a slightly different acoustic signature can be transmitted from each respective transceiver/transducer 32A-H, 34A-H simultaneously, which shortens measurement time Referring to steps 500 and 510 of the gas flow velocity measurement method flow chart of FIG. 11, once all transceiver/transducers in planes $Z_I$ and $Z_{II}$ have fired and the transmitted acoustic signals have been received by the opposing plane of transversely aligned transceivers/transducers, the process preferably repeats continually in real time while a 3-D velocity map u is constructed from the spatially distributed line-of-sight acoustic paths, using known 3-D tomographic mapping techniques, such as those utilized in medical or industrial computed tomography systems. The velocity information is extracted and mapped, as shown in FIG. 8. Similarly, a 3-D temperature map T can be constructed utilizing the time of flight data, as will be described in greater detail herein.

After all of the transceiver/transducers 32, 34 in a planar array have fired acoustic signals the respective line-of-sight flow path time-of-flight data are used to derive absolute velocity in the gas flow path in step 560, once corrected for the thermodynamic effects of temperature, gas constant and the speed of sound, as described in greater detail below. Flow velocity measurement accuracy potentially decreases as flow velocity approaches the speed of sound, assuming constant gas temperature in the velocity measurements. Flow velocity below a Mach number of approximately 0.5 is not believed to impact velocity measurement significantly. Therefore it is preferable, but not required, that measured flow velocities should be smaller than half of the local speed of sound that is measured is. This method can accurately measure high temperature gas flows, including turbine engine gas flows, despite relatively high absolute velocities, because the local speed of sound increases with temperature.

Figure 6:
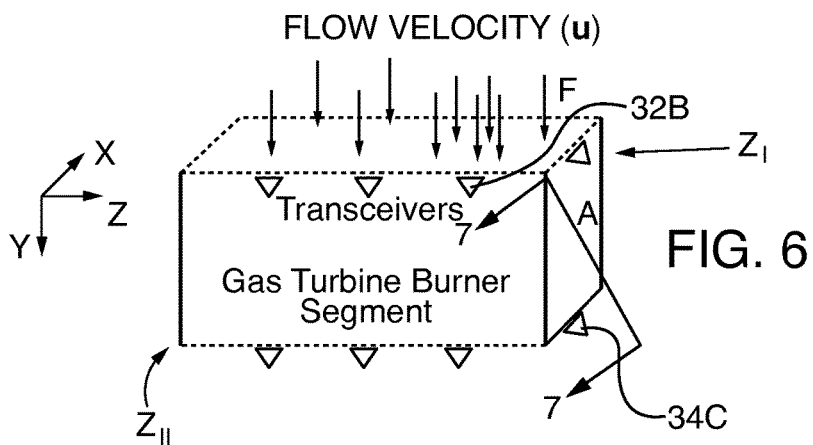
FIG. 6 is an exemplary schematic representation of gas flow velocity in the turbine combustor of FIG. 5 in the line-of-sight between acoustic sensors 32B and 34C.
Figure 7:
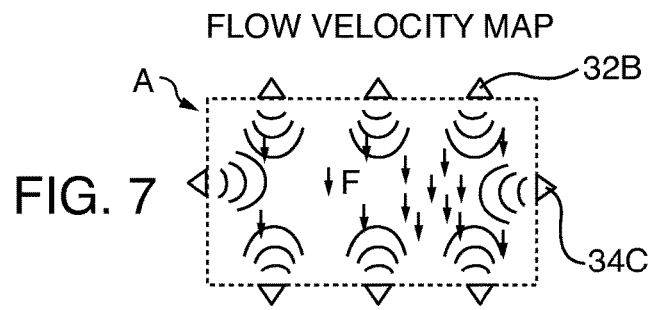
FIG. 7. is a cross-sectional slice A of the gas flow velocity of FIG. 6 taken along 7-7 thereof, which corresponds to the line-of-sight between acoustic sensors 32B and 34C.

Once acoustic time-of-flight data are available, they are used by the monitoring and control system 29 or other remote monitoring system to determine velocity along their respective acoustic paths in accordance with the remainder of the steps of FIG. 11. Referring to FIGS. 6 and 7, information sound propagation is linearly affected by the gas flow. Relative gas flow velocity for a given temperature, gas constant and speed of sound is determined by the known equation:

$$t_{BC} = \int_B^C \frac{1}{c(x, y, z) + \vec{p}_{BC} \cdot \vec{u}(x, y, z)} ds$$

Where:

$t_{BC}$ is the time-of-flight from the first transmitter B to the first sensor C;

c is the speed of sound in the gas flow for the temperature and gas constant;

$\vec{p}_{BC}$ is the unit vector along the first line of sound path A between B and C; and $\vec{u}(x,y,z)$ is velocity vector in the gas flow.

The exemplary planar slice along the line-of-sound path A shows a simplified flow pattern. Referring again to the flow chart of FIG. 11, the relative gas flow velocity is corrected for thermodynamic temperature, gas flow and speed of sound influences, in order to derive absolute velocity in step 560. If the path temperature is available (step 520) its influence on the speed of sound can be corrected by known tomography methods, in order to derive the gas flow absolute velocity along the line-of-sound path. If the path temperature is not available, times-of-flight for forward (steps 500, 510) and reverse (steps 530, 540) acoustic signal transmission are acquired and used to extract the speed of sound without effect of the gas velocity in accordance with the following equations. The reverse time-of-flight from transducer/transceiver C to transducer/transceiver B is determined by the following equation, similar to that for the forward or downstream direction set forth above:

$$t_{CB} = \int_C^B \frac{1}{c(x, y, z) + \vec{p}_{BC} \cdot \vec{u}(x, y, z)} ds$$

The forward and reverse times-of-flight are added in accordance with the following equation:

$$t_{BC} + t_{CB} = \int_B^C \frac{2 \cdot c(x, y, z)}{c(x, y, z)^2 - \vec{p}_{BC} \cdot \vec{u}(x, y, z)^2} ds$$

Given that the square of the speed of sound c is much greater than the square of the gas flow velocity u, the equation is reduced to:

$$t_{BC} + t_{CB} \approx \int_B^C \frac{2}{c(x, y, z)} ds$$

where:

$t_{BC}$ is the time of flight from the first transceiver/transducer B to the second transceiver/transducer C;

$t_{CB}$ is the time of flight from the second transceiver/transducer C to the first transceiver/transducer B;

c is the speed of sound in the gas flow for the temperature and gas constant;

$\vec{p}_{BC}$ is the unit vector along the first line of sound path; and $\vec{u}(x,y,z)$ is the velocity vector in the gas flow.

The speed of sound c determined in step 550 of FIG. 11 is then used to correct the downstream time-of-flight data for that speed of sound in step 560. The corrected downstream time-of-flight data are used to determine gas flow absolute velocity in step 570. Where the path temperature T along a line-of-flight is not known, the same speed of sound c determined in step 550 is utilized in some embodiments of the invention to determine T, using the previously described isentropic speed of sound relationship $$c(x, y, z) = (\gamma \cdot R \cdot T)^{\frac{1}{2}},$$

as γ, R and c(x,y,z) is now known. In a similar manner to the path velocity determinations previously described, once all the path temperatures T are known from each receiver/transmitter unit back and forth, there will be 64 (assuming exemplary 8-sensor case) iso-temperature lines in 3-dimensions. Then using known 3-D tomographic mapping techniques, the 3-dimensional temperature distribution is mapped.

Advantageously the active acoustic temperature and velocity measurements are performed simultaneously in real time, thus mapping both gas flow temperature (3-D or alternatively the 2-D mapping of FIG. 9) and 3-D gas flow velocity (FIG. 8). An exemplary acoustic signal transmission and reception timing sequence to perform simultaneous velocity and temperature measurement is to emit an acoustic signal with a transceiver/transducer on a first array plane (e.g., 32A at $Z_I$). The corresponding transversely oriented transceivers/transducers on an axially spaced opposed second plane (e.g., 34B-H at $Z_{II}$) receive the signal for velocity processing and/or temperature processing, if 3-D temperature measurement is utilized. If only 2-D temperature measurement is utilized the remainders of the transceiver/transducers on the first array plane (e.g., 32B-H at ZI) receive the signal for temperature processing. As previously noted the transmission and receiving process also can be accelerated by utilizing unique signal transmission patterns for each transceiver/transducer. There are tradeoffs associated with use of 2-D or 3-D temperature measurement. Where 3-D temperature measurement techniques are utilized, accuracy of both temperature and velocity map may not be the most desired in case of gas velocities of Mach 0.3 or above as the approximation shown in the equation $$t_{BC} + t_{CB} \approx \int_B^C \frac{2}{c(x, y, z)} ds$$

may be less accurate in those velocities ranges, because there are no independently determined temperature reference values. However, independent temperature T reference values may be determined, using a pair of axially separated 2-D acoustic signal sets and two individual acoustic temperature maps determined with the respective 2-D time-of-flight signal sets. The 2-D temperature maps are in turn interpolated to create a volumetric temperature map. This volumetric map will be used to provide the temperature values T utilized in the isentropic speed of sound equation, along with the known gas constant R and specific heat ratio γ to extract speeds of sound c. The speed of sound is then used to extract the velocity vectors u(x,y,z). Once the velocity vectors are extracted the velocity components can be mapped, eliminating the limitation of below Mach 0.3 gas velocities inherent in the previously described 3-D velocity and temperature mapping methods.

Combustor active gas flow velocity or velocity/temperature monitoring utilizing the system and method embodiments described herein with arrays of commonly utilized acoustic sensors is believed to provide faster velocity and temperature change response than known velocity and temperature monitoring systems. In accordance with embodiments of the invention one array of commonly utilized, reliable acoustic transceiver/transducer sensor-transmitters or arrays of separate discrete acoustic sensors and transmitter pairs can be placed in a combustion flow path under field conditions and monitored to provide active, real time simultaneous velocity and temperature data and anomaly detection that are all useful for monitoring and control of combustion power generation equipment, such as industrial gas turbines.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The exemplary engine 10 and exemplary combustor 14 are shown by way of illustration and not by way of limitation, to clearly describe certain features and aspects of the present invention set out in greater detail herein. However, the various aspects of the present invention described more fully herein may be applied to various combustion engines to monitor and/or detect the occurrence of combustion anomalies. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for actively monitoring gas flow temperature, comprising:
    placing at least one first acoustic transmitter and at least one first acoustic sensor respectively oriented in a common axial plane in the gas flow path and in a distinct first line-of-sound path relative to each other, the first sensor capable of generating first sensor output signals indicative of first thermoacoustic oscillations;
    coupling the at least one first transmitter and the at least one first sensor to the controller that is capable of causing the at least one first transmitter to transmit first acoustic signals within the gas flow path and capable of correlating the first sensor output signals time-of-flight with gas flow temperature;
    processing, via a processor, the first time-of-flight for the first acoustic signals traveling along the first line of sound paths to determine respective gas flow temperature along each respective first line-of-sound path;
    placing at least one second acoustic transmitter and at least one second acoustic sensor respectively oriented in a common axial plane in the gas flow path downstream of the first acoustic transmitter and sensor, and in a distinct second line-of-sound path relative to each other, the second sensor capable of generating second sensor output signals indicative of second thermoacoustic oscillations;
    coupling the at least one second transmitter and the at least one second sensor to the controller that is capable of causing the at least one second transmitter to transmit second acoustic signals within the gas flow path and capable of correlating the second sensor output signals time-of-flight with gas flow temperature;
    processing, via the processor, the second time-of-flight for the second acoustic signals traveling along the second line of sound paths to determine respective gas flow temperature along each respective second line-of-sound path; and
    interpolating determined respective gas flow temperatures along each respective first and second line-of-sound path to create a volumetric temperature map.

2. A method for controlling combustion in an industrial gas turbine combustor using the interpolated gas flow temperatures determined by the method of claim 1.

3. A method for mapping temperature in an industrial gas turbine combustor, comprising tomographically mapping the gas flow temperatures along each respective first and second line-of-sound path that were determined by the method of claim 1.

4. A method for determining gas flow velocity in an industrial gas turbine combustor, using the interpolated gas flow temperatures determined by the method of claim 1.

5. The method of claim 1, the processing to determine respective gas flow absolute temperature along each respective first line-of-sound path, including compensation for gas specific heat ratio, gas constant and speed of sound thermodynamic influences on the first time-of-flight.

6. The method of claim 5, the processing to determine respective absolute gas flow temperature including compensation for variations in temperature and gas constant on the speed of sound, comprising:
    substituting for the first transmitters first transceiver/transducers that are capable of transmitting and receiving acoustic signals, and generating output signals;
    substituting for the first sensors second transceiver/transducers that are capable of transmitting and receiving acoustic signals and generating output signals;
    coupling the respective at least one of the respective first and second transceiver/transducers to the controller that is capable of causing either to transmit first acoustic signals within the gas flow path and capable of correlating transceiver/transducer output signals time-of-flight with gas flow velocity;
    transmitting first acoustic signals from the at least one first transceiver/transducer;
    receiving the first acoustic signals from the at least one first transceiver/transducer and generating first dynamic sensor output signals with the at least one second transceiver/transducer that includes contributions of the received first acoustic signals;
transmitting reversed first acoustic signals from the at least one second transceiver/transducer;
receiving the reversed first acoustic signals from the at least one second transceiver/transducer and generating first reversed dynamic sensor output signals with the at least one first transceiver/transducer that includes contributions of the received reversed first acoustic signals;
determining a first time-of-flight for the respective first and reversed first acoustic signals traveling along each of the first line of sound paths; and
processing the first time-of-flight for the respective first and reversed first acoustic signals traveling along their respective first line of sound paths to determine the speed of sound and using the determined speed of sound to determine respective absolute gas flow temperature along each respective first line-of-sound path.

7. The method of claim 1, the processing of the first time-of-flight described by the equation:

$$t_{BC} = \int_B^C \frac{1}{c(x, y, z) + \vec{p}_{BC} \cdot \vec{u}(x, y, z)} ds$$

where:
$t_{BC}$ is the time of flight from the first transmitter to the first sensor;
c is the speed of sound in the gas flow for the temperature and gas constant;
$\vec{p}_{BC}$ is the unit vector along the first line of sound path; and
$\vec{u}(x,y,z)$ is velocity vector in the gas flow.

8. The method of claim 7, further comprising determining the speed of sound c by:
substituting for the first transmitters first transceiver/transducers that are capable of transmitting and receiving acoustic signals, and generating output signals;
substituting for the first sensors second transceiver/transducers that are capable of transmitting and receiving acoustic signals and generating output signals;
coupling the respective at least one of the respective first and second transceiver/transducers to the controller that is capable of causing either to transmit first acoustic signals within the gas flow path and capable of correlating transceiver/transducer output signals time-of-flight with gas flow velocity;
transmitting first acoustic signals from the at least one first transceiver/transducer;
receiving the first acoustic signals from the at least one first transceiver/transducer and generating first dynamic sensor output signals with the at least one second transceiver/transducer that includes contributions of the received first acoustic signals;
transmitting reversed first acoustic signals from the at least one second transceiver/transducer;
receiving the reversed first acoustic signals from the at least one second transceiver/transducer and generating first reversed dynamic sensor output signals with the at least one first transceiver/transducer that includes contributions of the received reversed first acoustic signals; and
determining a first time-of-flight for the respective first and reversed first acoustic signals traveling along each of the first line of sound paths; and
processing the first time-of-flight for the respective first and reversed first acoustic signals traveling along their respective first line of sound paths to determine the speed of sound c.

9. The method of claim 8, the processing of the respective first time of flight for the respective first and reversed first acoustic signals traveling along each of the first line of sound paths to determine the speed of sound c described by the equation:

$$t_{BC} + t_{CB} \approx \int_B^C \frac{2}{c(x, y, z)} ds$$

where:
$t_{BC}$ is the time of flight from the first transceiver/transducer to the second transceiver/transducer;
$t_{CB}$ is the time of flight from the second transceiver/transducer to the first transceiver/transducer;
c is the speed of sound in the gas flow for the temperature and gas constant;
$\vec{p}_{BC}$ is the unit vector along the first line of sound path; and
$\vec{u}(x,y,z)$ is the velocity vector in the gas flow.

* * * * *